(12) United States Patent
Czachor

(10) Patent No.: US 6,584,766 B1
(45) Date of Patent: Jul. 1, 2003

(54) METHODS AND APPARATUS FOR MINIMIZING THERMAL STRESSES IN A CENTERBODY

(75) Inventor: Robert P. Czachor, Cincinnati, OH (US)

(73) Assignee: General Electric Co., Schenectady, NY (US)

(*) Notice: Subject to any disclaimer, the term of this patent is extended or adjusted under 35 U.S.C. 154(b) by 0 days.

(21) Appl. No.: 09/535,922

(22) Filed: Mar. 24, 2000

(51) Int. Cl.⁷ ................................................ F02K 1/04
(52) U.S. Cl. ........................ 60/266; 60/264; 239/127.1; 239/127.3
(58) Field of Search .................... 60/226.1, 266, 60/271, 39.5, 39.83, 264, 770; 239/127.1, 127.3, 265.17; 181/220, 215, 216, 213

(56) References Cited

U.S. PATENT DOCUMENTS

| | | | | |
|---|---|---|---|---|
| 2,674,845 A | * | 4/1954 | Pouchot | 60/264 |
| 2,696,712 A | * | 12/1954 | Lewis | 60/266 |
| 2,709,337 A | * | 5/1955 | Markowski | 239/127.3 |
| 2,811,827 A | * | 11/1957 | Kress | 239/127.3 |
| 3,210,934 A | * | 10/1965 | Smale | 60/266 |
| 3,262,264 A | * | 7/1966 | Gardiner et al. | 239/127.3 |
| 3,373,567 A | * | 3/1968 | Palfreyman et al. | 60/264 |
| 3,693,880 A | * | 9/1972 | Versaw et al. | 239/127.3 |
| 3,970,252 A | * | 7/1976 | Smale et al. | 239/127.3 |
| 3,981,143 A | * | 9/1976 | Ross et al. | 60/264 |
| 4,004,416 A | * | 1/1977 | Amelio et al. | 239/127.3 |
| 4,044,555 A | * | 8/1977 | McLoughlin et al. | 60/264 |
| 4,098,076 A | * | 7/1978 | Young et al. | 60/266 |
| 4,109,864 A | * | 8/1978 | Clayton | 239/127.3 |
| 4,137,992 A | * | 2/1979 | Herman | 181/213 |
| 4,214,441 A | * | 7/1980 | Mouritsen et al. | 60/264 |
| 4,214,703 A | * | 7/1980 | Sorensen et al. | 239/127.3 |
| 4,240,519 A | * | 12/1980 | Wynosky | 181/213 |
| 4,271,666 A | * | 6/1981 | Hurley et al. | 60/266 |
| 4,754,924 A | * | 7/1988 | Shannon | 239/127.3 |
| 5,261,229 A | | 11/1993 | Ford et al. | |
| 5,407,133 A | * | 4/1995 | Liang | 239/127.3 |
| 5,421,158 A | | 6/1995 | Stenger et al. | |
| 5,657,633 A | | 8/1997 | Brueggert | |
| 5,813,221 A | | 9/1998 | Geiser et al. | |
| 5,970,716 A | | 10/1999 | Forrester et al. | |

* cited by examiner

*Primary Examiner*—Ted Kim
(74) *Attorney, Agent, or Firm*—Rodney M. Young; Armstrong Teasdale LLP; Robert B. Reeser, III

(57) ABSTRACT

A centerbody for a gas turbine engine includes a thermal control system which minimizes the thermal stresses between the centerbody and at least one stiffener. The centerbody stiffener extends radially inward from a centerbody shell. A cavity is defined within each centerbody stiffener. The thermal control system includes a plurality of openings circumferentially disposed around the centerbody. Each opening extends through the centerbody shell into each cavity. The openings include pairs of entrance openings and exit openings which permit circumferential flow to develop within the centerbody cavity.

20 Claims, 4 Drawing Sheets

METHODS AND APPARATUS FOR MINIMIZING THERMAL STRESSES IN A CENTERBODY

BACKGROUND OF THE INVENTION

This application relates generally to gas turbine engines and, more particularly, to gas turbine engines including exhaust centerbodies.

Gas turbine engines often include exhaust augmentors to increase overall engine performance and a centerbody is used to lower the velocity of the air and gas flows entering the augmentor. The centerbody is typically positioned coaxial with a center longitudinal axis of the gas turbine engine and extends from a turbine core at least partially into the augmentor. Because of engine weight considerations, such centerbodies are fabricated from thin sheet metal. Such thin centerbody shells have relatively low natural frequencies and may be subject to potentially damaging resonance or vibrations generated during engine operation.

In an effort to prevent such potentially damaging vibrations from having an adverse effect on the centerbody, stiffeners are used to structurally support the centerbody. The stiffeners are attached to an inner surface of the centerbody shell and extend radially inward. A cavity is defined between the stiffener and the centerbody shell. During operation, cooling air is channeled within the centerbody and around the stiffener to prevent the centerbody from overheating. As the gas turbine engine is accelerated from an idle operating condition to an increased power condition, the outer surface of the centerbody is exposed to high temperature gas flows. As a result of heat transfer and the cooling air, an outer surface of the centerbody is exposed to much higher temperatures than the stiffener. Upon deceleration of the engine, the opposite effect occurs between the centerbody surface and the stiffener. As a result of the temperature differences, thermal stresses develop between the stiffeners and the centerbody shell. Such thermal stresses often lead to a failure of the centerbody.

BRIEF SUMMARY OF THE INVENTION

In an exemplary embodiment, a centerbody for a gas turbine engine includes a thermal control system which minimizes thermal stresses between a centerbody and at least one centerbody stiffener. The centerbody includes a at least one stiffener attached to a centerbody shell and extending radially inward. Each stiffener and the centerbody shell define a cavity. The thermal control system includes a plurality of openings extending through the centerbody shell into each cavity. The openings are located circumferentially disposed around the centerbody and include pairs of corresponding entrance openings and exit openings. Each entrance opening is disposed circumferentially from each exit opening.

In the exemplary embodiment, each entrance opening is positioned downstream from each frame strut of the engine. Each exit opening is positioned between two circumferentially adjacent frame struts.

During operation, because the entrance openings are positioned downstream from the frame struts, the entrance openings are exposed to wake airflow. In contrast, the exit openings are directly in the flowpath of the airflow. As a result, a pressure differential develops between the entrance openings and the exit openings. Such a pressure differential permits circumferential flow to develop within the cavity. As a result, less thermal differences exist between each stiffener and the centerbody. Additionally, the temperature of each stiffener increases and decreases more rapidly as engine operating power levels are changed. Furthermore, circumferential temperature variations within the centerbody are minimized. As a result, less thermal stresses are induced within the centerbody.

DETAILED DESCRIPTION OF THE INVENTION

Figure 1:
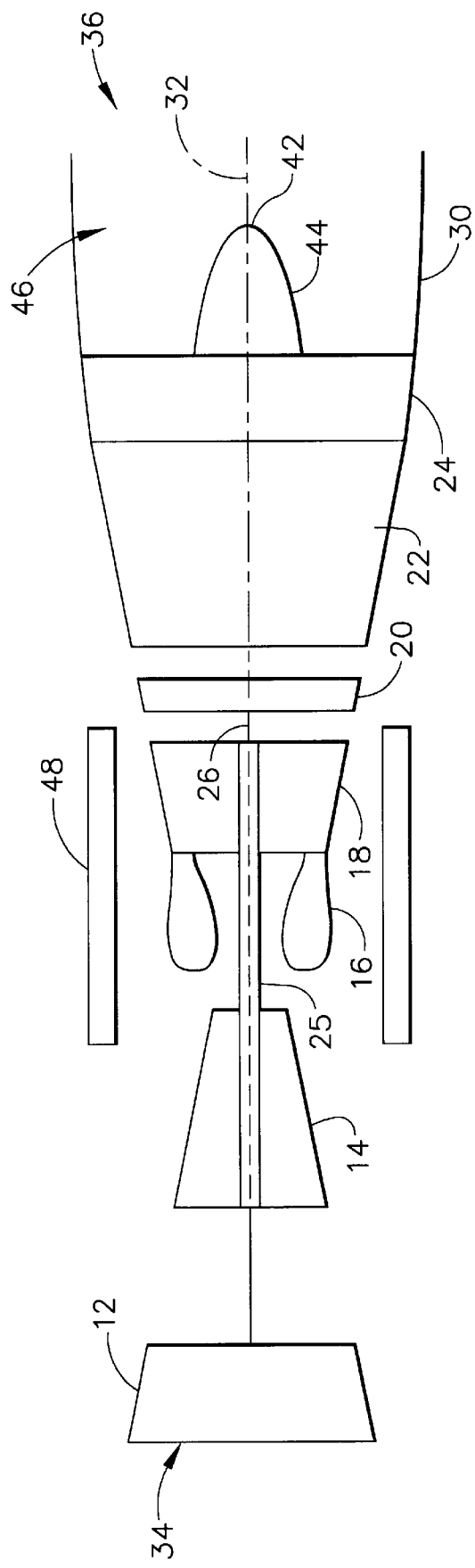
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18, a low pressure turbine 20, a power turbine 22, and an exhaust augmentor 24. Compressor 12 and turbine 20 are coupled by a first shaft 25, and compressor 14 and turbine 18 are coupled by a second shaft 26. Engine 10 has an axis of symmetry 32 extending from an inlet side 34 of engine 10 aftward to an exhaust side 36 of engine 10.

Exhaust augmentor 24 includes a centerbody 42 includes a shell 44 fabricated from thin sheet metal for engine weight control. Centerbody 42 is annular and is disposed co-axially with engine axis of symmetry 32 and extends aft from turbine 22 into a nozzle 46 of engine 10. In one embodiment, exhaust centerbody 42 is fabricated from sheet metal having a thickness of approximately 0.02 inches.

In operation, air flows through low pressure compressor 12 from inlet side 34 of engine 10 and compressed air is supplied from low pressure compressor 12 to high pressure compressor 14. Highly compressed air is then delivered to combustor 16 and airflow from combustor 16 drives turbines 18, 20, and 22. Airflow enters exhaust augmentor 24 from turbine 22 and from a bypass duct 48. Exhaust augmentor 24 re-ignites the airflow with at least one igniter (not shown in FIG. 1) and the airflow exits gas turbine engine 10 around centerbody 42 through nozzle 46.

Figure 2:
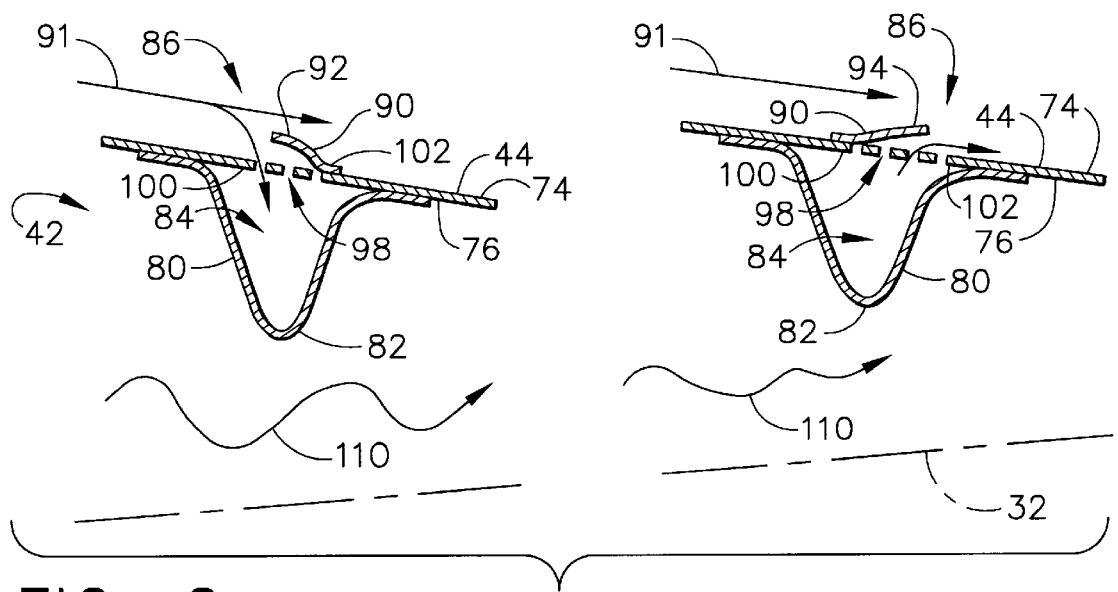
FIG. 2 is a partial schematic side view of a centerbody which may be used with the gas turbine engine shown in FIG. 1.
Figure 3:
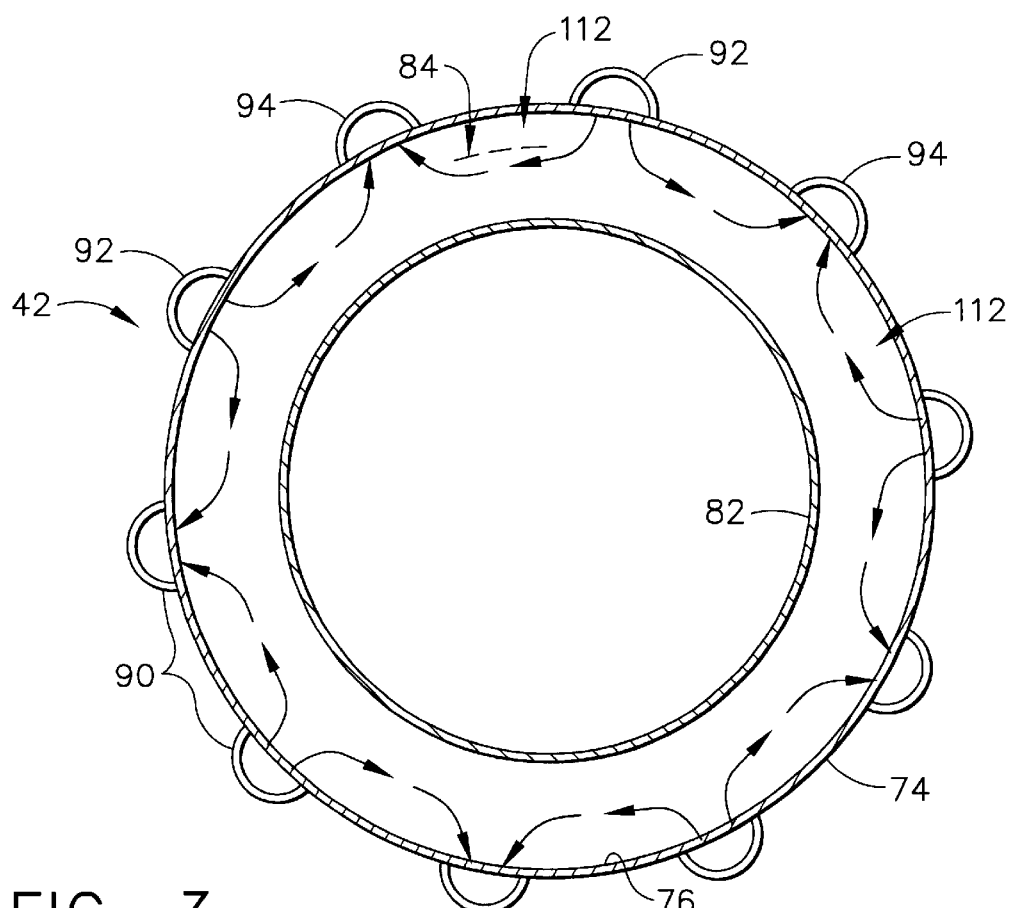
FIG. 3 is a cross-sectional schematic view of the centerbody shown in FIG. 2.

FIG. 2 is a partial schematic side view of centerbody 42 including centerbody shell 44. FIG. 3 is a cross-sectional schematic view of centerbody 42 including shell 44. Centerbody 42 is hollow and shell 44 includes an outer surface 74 and an inner surface 76. At least one stiffener 80 is attached to shell inner surface 76 and extends radially inward towards engine axis of symmetry 32. In one embodiment, stiffeners 80 are hat-section type stiffeners and are generally conical in shape with a curved apex 82. Stiffeners 80 are annular and are attached circumferentially within centerbody 42 to provide support to centerbody shell 44.

A cavity 84 is formed between stiffener 80 and centerbody shell 44. Cavity 84 is annular and extends circumferentially within centerbody 42. Centerbody shell. 44 also includes a thermal control system 86 for reducing an amount of thermal stresses within centerbody 42. System 86 is disposed within centerbody 42 and includes a plurality of scoops 90 which permit airflow 91 to travel through cavity 84. Scoops 90 extend radially outward from centerbody shell outer surface 74 and are spaced circumferentially around centerbody 42. In one embodiment, scoops 90 are formed integrally with centerbody shell 44. Scoops 90 include corresponding pairs of entrance scoops 92 and exit scoops 94. Each exit scoop 94 is circumferentially removed from each corresponding entrance scoop 92.

Each scoop 90 is positioned adjacent an opening 98 in centerbody shell 44. Openings 98 are defined by a perimeter (not shown) and permit air to flow within centerbody cavity 84. Each opening 98 includes an upstream side 100 and a downstream side 102. Each entrance scoop 92 extends radially outward from the opening perimeter and is positioned such that downstream side 102 of each opening 98 is bordered by entrance scoop 92. Each exit scoop 94 extends radially outward from the opening perimeter and is positioned such that upstream side 100 of each opening 98 is bordered by exit scoop 94. Accordingly, entrance scoops 92 permit airflow 91 to enter centerbody cavity 84 and exit scoops 94 permit airflow 91 to exit centerbody cavity 84. In one embodiment, centerbody shell 44 includes an equal number of entrance scoops 92 and exit scoops 94. Additionally, each entrance scoop 92 faces upstream and opens into airflow 91 and each exit scoop 94 opens in an opposite direction and faces downstream to open away from airflow 91.

During operation of gas turbine engine 10 (shown in FIG. 1), hot gases exit turbine 22 (shown in FIG. 1) and by-pass duct 48 (shown in FIG. 1) and are channeled into augmentor 24 (shown in FIG. 1). Centerbody 42 is shaped to decrease the velocity of the hot gases as they enter augmentor 24. Additional airflow 110 is directed through centerbody 42 with a lower velocity than the velocity of airflow 91.

During operation, centerbody entrance scoops 92 direct a portion of airflow 91 into centerbody 42. Airflow 91 is channeled through centerbody cavity 84 and exits cavity 84 through exit scoops 94. Because entrance scoops 92 face into airflow 91 and open into airflow 91, entrance scoops 92 are impacted by a total pressure of airflow 91. Because each exit scoop 94 faces downstream and opens away from airflow 91, a lower static pressure develops adjacent each exit scoop 94. This difference in pressures causes circumferential flow 112 to develop within centerbody cavity 84. As a result of airflow 112, less thermal mismatch exists between centerbody 42 and each stiffener 80 and thermal stresses are reduced within centerbody 42. Additionally, airflow 112 reduces circumferential temperature variations that may exist within centerbody 42, thus reducing a mean stress level in centerbody 42. As a result, vibratory stress capability of centerbody 42 is increased.

Figure 4:
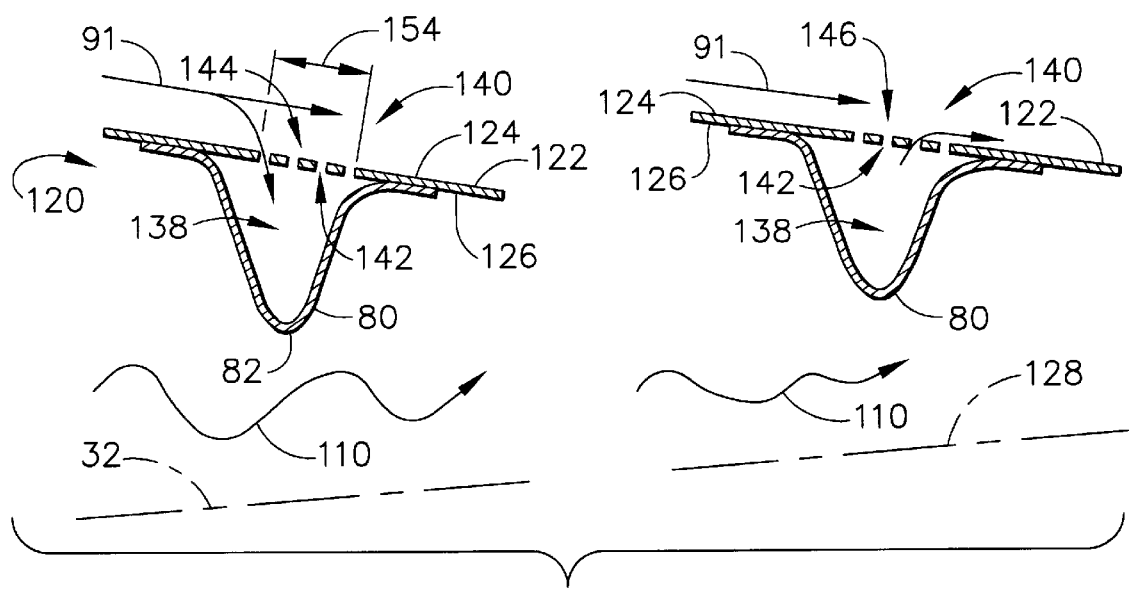
FIG. 4 is a partial schematic side view of an alternative embodiment of a centerbody which may be used with the gas turbine engine shown in FIG. 1.
Figure 5:
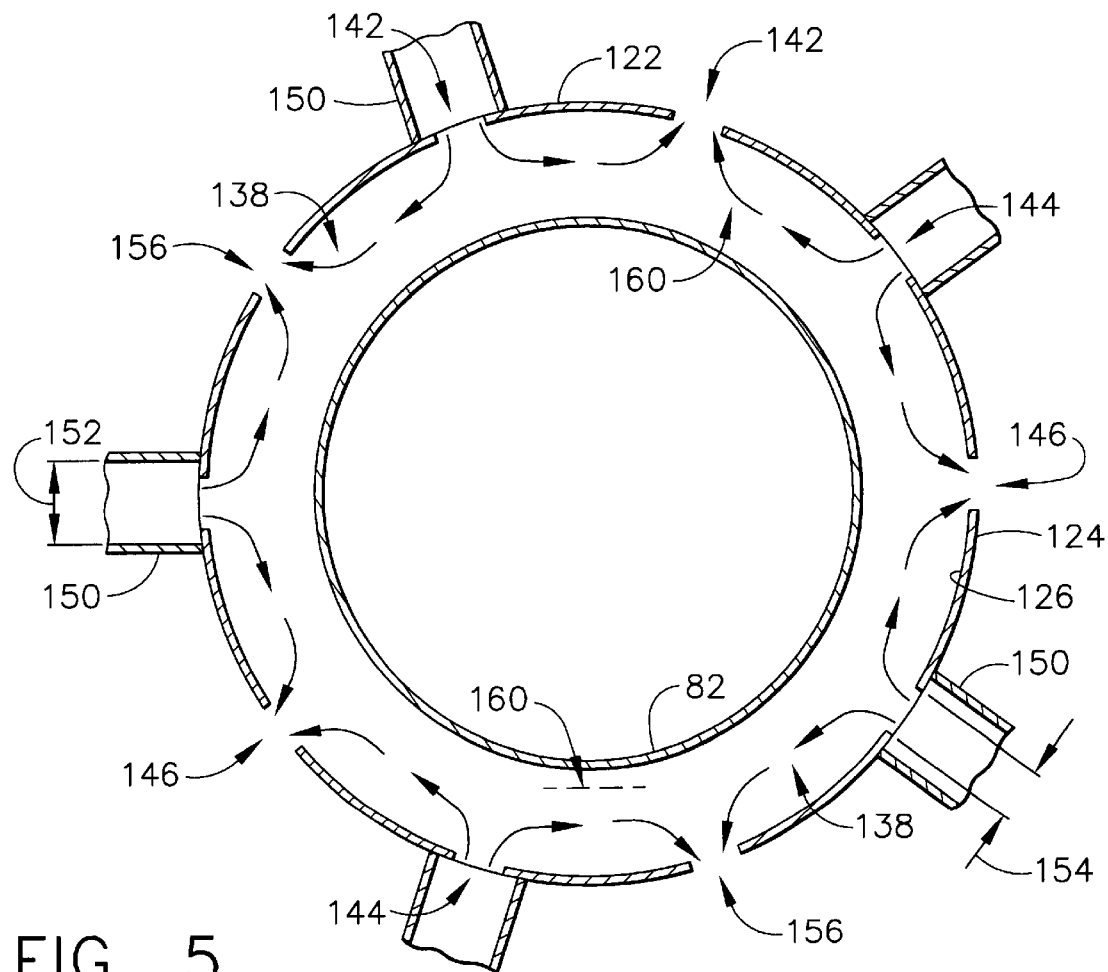
FIG. 5 is a cross-sectional schematic view of the centerbody shown in FIG. 4.

FIG. 4 is a partial schematic side view of an alternative embodiment of a centerbody 120 which may be used with gas turbine engine 10 (shown in FIG. 1). FIG. 5 is a cross-sectional schematic view of centerbody 120. Centerbody 120 is hollow and includes a shell 122. Shell 122 includes an outer surface 124 and an inner surface 126. Each respective stiffener 80 is attached to centerbody shell inner surface 122 and extends radially inward towards a centerbody axis of symmetry 128. Centerbody axis of symmetry 128 is coaxial with engine axis of symmetry 32. Centerbody shell inner surface 122 and each respective stiffener 80 define cavities 138. Each cavity 138 is annular and extends circumferentially within centerbody 120.

Centerbody 120 includes a thermal control system 140 which reduces thermal stresses within centerbody 120. Thermal control system 140 includes a plurality of openings 142 which permit airflow 91 to travel through cavity 138. Openings 142 are spaced evenly circumferentially around centerbody 120 and extend through centerbody shell 122 into cavity 138. Openings 142 include corresponding pairs of entrance openings 144 and exit openings 146. Each exit opening 146 is located between adjacent corresponding entrance openings 144. Each entrance opening 144 is located downstream of a frame strut 150. Each frame strut 150 has a thickness 152 and extends between centerbody 120 and an augmentor inner surface (not shown). Each opening 142 has a diameter 154 less than frame strut thickness 152. Accordingly, each entrance opening 144 is centered downstream of each frame strut 150.

An annulus 156 exists between each of two circumferentially adjacent frame struts 150. Each exit opening 146 is positioned within each annulus 156. In one embodiment, each exit opening 146 is disposed within each annulus 156 and centered between adjacent frame struts 150.

During operation of gas turbine engine 10 (shown in FIG. 1), hot gases exit turbine 22 (shown in FIG. 1) and by-pass duct 28 (shown in FIG. 1) and are channeled into augmentor 24 (shown in FIG. 1) and centerbody 120 is shaped to decrease the velocity of the hot gases as they enter augmentor 24. Additional airflow 110 is directed through centerbody 120. Airflow 110 is directed through centerbody 120 with a lower velocity than the velocity of airflow 91.

As airflow 91 passes around each frame strut 150 and through each annulus 156. Aerodynamic losses at each frame strut 150 reduce a velocity, create airflow wakes (not shown), and increase a pressure of airflow 91 within the airflow wakes. Because entrance openings 144 are aligned behind frame struts 150 within the airflow wakes and exit openings 146 are disposed within each annulus 156 between frame struts 150, a pressure differential develops between entrance and exit openings 144 and 146 to create a circumferential flow 160 within each centerbody cavity 138. As a result of airflow 160, less thermal differences exist between centerbody cavity 138 and centerbody 120. Accordingly, thermal stresses are reduced within centerbody 120. Additionally, airflow 160 reduces circumferential temperature variations that may exist within centerbody 120, thus reducing a mean stress level in centerbody 120. As a result, a vibratory stress capability of centerbody 120 is increased.

Figure 6:
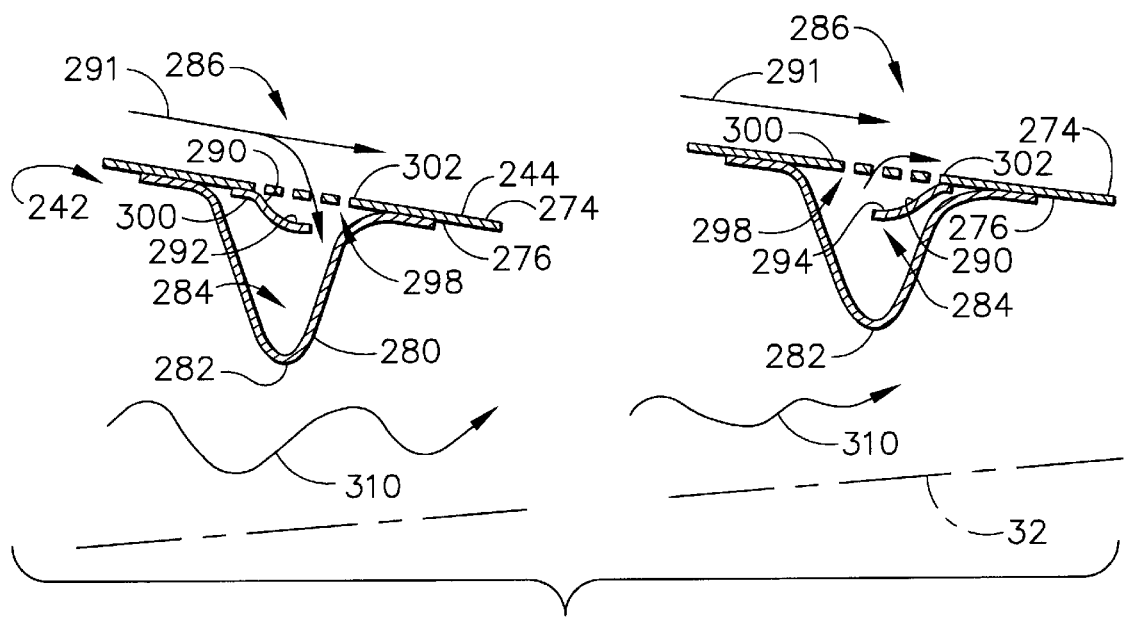
FIG. 6 is a partial schematic side view of an alternative embodiment of a centerbody which may be used with the gas turbine engine shown in FIG. 1.
Figure 7:
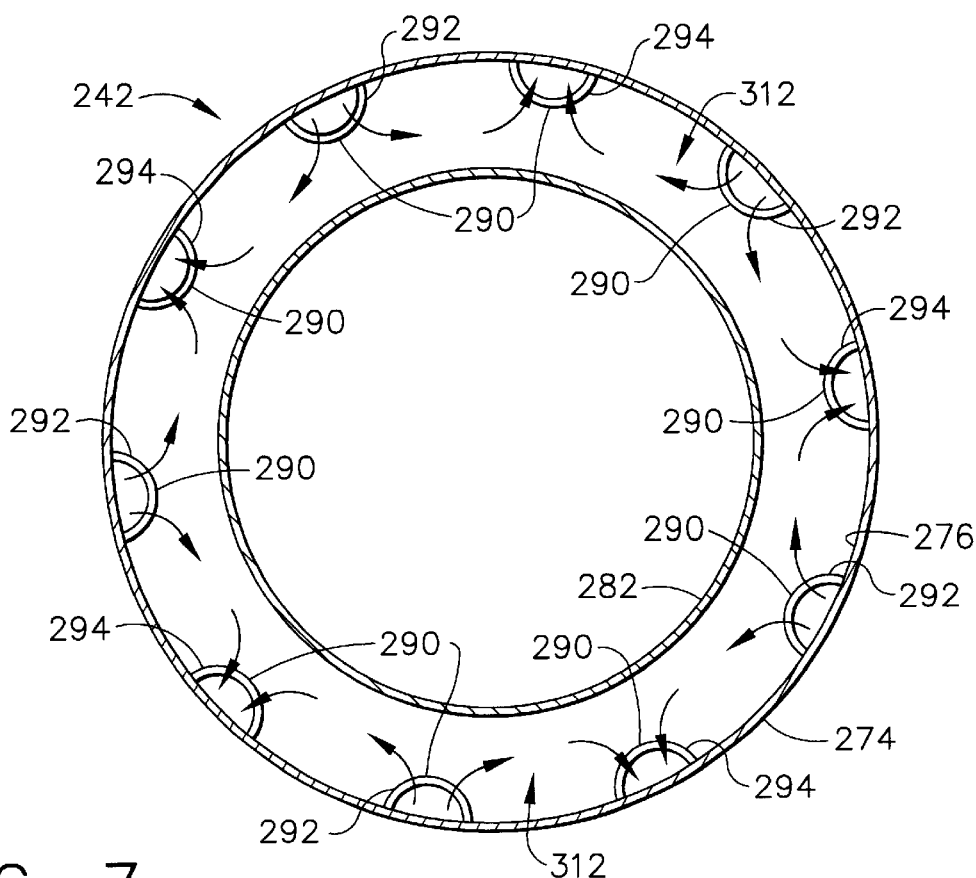
FIG. 7 is a cross-sectional schematic view of the centerbody shown in FIG. 6.

FIG. 6 is a partial schematic side view of an alternative embodiment of a centerbody 242 which may be used with gas turbine engine 10 (shown in FIG. 1). FIG. 7 is a cross-sectional schematic view of centerbody 242 including centerbody shell 244. Centerbody 242 is hollow and shell 244 includes an outer surface 274 and an inner surface 276. At least one stiffener 280 is attached to shell inner surface 276 and extends radially inward towards engine axis of symmetry 32. In one embodiment, stiffeners 280 are hat-section type stiffeners and are generally conical in shape with a curved apex 282. Stiffeners 280 are annular and are attached circumferentially within centerbody 242 to provide support to centerbody shell 244.

A cavity 284 is formed between stiffener 280 and centerbody shell 244. Cavity 284 is annular and extends circumferentially within centerbody 242. Centerbody shell 244 also includes a thermal control system 286 for reducing an amount of thermal stresses within centerbody 242. System 286 is disposed within centerbody 242 and includes a plurality of scoops 290 which permit airflow 291 to travel through cavity 284. Scoops 290 extend radially inward from centerbody shell inner surface 276 and are spaced circumferentially around centerbody 242. In one embodiment, scoops 290 are formed integrally with centerbody shell 244. Scoops 290 include corresponding pairs of entrance scoops 292 and exit scoops. 294. Each exit scoop 294 is circumferentially removed from each corresponding entrance scoop 292.

Each scoop 290 is positioned adjacent an opening 298 in centerbody shell 244. Openings 298 are defined by a perimeter (not shown) and permit air to flow within centerbody cavity 284. Each opening 298 includes an upstream side 300 and a downstream side 302. Scoops 290 are sized to circumferentially border approximately one-half of each opening 298. Each entrance scoop 292 extends radially inward from the opening perimeter and is positioned such that upstream side 300 of each opening 298 is bordered by entrance scoop 292. Each exit scoop 294 extends radially inward from the opening perimeter and is positioned such that downstream side 302 of each opening 298 is bordered by exit scoop 294. Accordingly, entrance scoops 292 permit airflow 291 to enter centerbody cavity 284 and exit scoops 294 permit airflow 291 to exit centerbody cavity 284. In one embodiment, centerbody shell includes an equal number of entrance scoops 292 and exit scoops 294.

During operation of gas turbine engine 10 (shown in FIG. 1), hot gases exit turbine 22 (shown in FIG. 1) and by-pass duct 48 (shown in FIG. 1) and are channeled through augmentor 24 (shown in FIG. 1). Centerbody 242 is shaped to decrease the velocity of the hot gases as they enter augmentor 24. Additional airflow 310 is directed through centerbody 242 with a lower velocity than a velocity of airflow 291.

During operation, airflow 291 is channeled through centerbody cavity entrance scoops 292 into cavity 284 and exits cavity 284 through exit scoops 294. Entrance scoops 292 are impacted by a total pressure of airflow 291. A lower static pressure develops adjacent each exit scoop 294 which causes circumferential flow 312 to develop within centerbody cavity 284. As a result of airflow 312, less thermal mismatch exists between centerbody 242 and each respective stiffener 280 and thermal stresses are reduced within centerbody 242. Additionally, airflow 312 reduces circumferential temperature variations that may exist within centerbody 242, thus reducing a mean stress level in centerbody 242. As a result, vibratory stress capability of centerbody 242 is increased.

Alternatively, centerbody 242 includes combinations of openings 298 similar to openings 142 (shown in FIG. 4), scoops 90 (shown in FIG. 1), and scoops 290.

The above-described centerbody is cost-effective and highly reliable. The centerbody includes a thermal control system to reduce the amount of thermal stresses within the centerbody. The thermal control system includes a plurality of corresponding pairs of entrance openings and exit openings which permit airflow to flow through a cavity created within the centerbody with a plurality of stiffeners. As a result, a centerbody is provided which permits a corresponding gas turbine engine to operate with a high efficiency and performance while the amount of thermal stresses induced within the centerbody are minimized.

While the invention has been described in terms of various specific embodiments, those skilled in the art will recognize that the invention can be practiced with modification within the spirit and scope of the claims.

What is claimed is:

1. A method for fabricating a gas turbine engine exhaust centerbody, the centerbody including a longitudinal centerline axis, an outer skin, at least one stiffener, and a thermal control system, the thermal control system including a plurality of openings, said method comprising the steps of:

attaching the at least one stiffener to the outer skin such that the at least one stiffener extends radially inward and defines an annular cavity with the outer skin, wherein the cavity is between the outer skin and the at least one stiffener, and wherein a downstream end of the centerbody is sealed; and forming a plurality of openings circumferentially around the exhaust centerbody such that the openings extend through the exhaust centerbody outer skin to the annular cavity, and such that at least a portion of the openings are in flow communication with a gas turbine engine flowpath to receive air therethrough for reducing thermal differences between the at least one stiffener and the centerbody, and such that the air is only discharged from the cavity through a portion of the openings such that a circumferential airflow about the longitudinal axis is induced within the cavity.

2. A method in accordance with claim 1 wherein the plurality of openings include pairs of entrance openings and exit openings, said step of forming a plurality of openings further comprising the step of positioning each entrance opening between circumferentially adjacent exit openings.

3. A method in accordance with claim 2 wherein the gas turbine engine includes a plurality of frame struts upstream of the centerbody, said step of forming a plurality of openings further comprising the steps of:

positioning each entrance opening downstream of a strut; and positioning each exit opening between two circumferentially adjacent struts.

4. A method in accordance with claim 2 wherein the exhaust centerbody further comprises a plurality of entrance scoops and a corresponding plurality of exit scoops, said step of forming a plurality of openings further comprising the steps of:

positioning each thermal control system entrance opening adjacent each entrance scoop; and positioning each thermal control system exit opening adjacent each exit scoop.

5. An exhaust centerbody for a gas turbine engine including a longitudinal centerline axis, said exhaust centerbody comprising:

an outer skin;

at least one stiffener attached to said outer skin and extending radially inward from said outer skin, said at least one stiffener and said outer skin defining an annular cavity extending between said at least one stiffener and said outer skin; and a plurality of openings extending through said outer skin to said cavity, said openings comprising pairs of openings for receiving and discharging airflow such that a circumferential airflow about the longitudinal centerline axis is induced to reduce thermal differences between said at least one stiffener and said centerbody, a downstream end of said centerbody sealed such that airflow is only discharged from said cavity through said openings.

6. An exhaust centerbody in accordance with claim 5 wherein said at least one stiffener is disposed circumferentially around said exhaust centerbody, said plurality of openings disposed circumferentially around said centerbody.

7. An exhaust centerbody in accordance with claim 6 wherein said plurality of openings comprises pairs of entrance openings and exit openings, each of said exit openings disposed between circumferentially adjacent entrance openings.

8. An exhaust centerbody in accordance with claim 7 wherein the gas turbine engine includes a plurality of struts upstream of said centerbody, said entrance openings disposed downstream of each of the struts.

9. An exhaust centerbody in accordance with claim 8 wherein each of said exit openings is disposed between two circumferentially adjacent struts.

10. An exhaust centerbody in accordance with claim 7 further comprising a plurality of scoops attached to said exhaust centerbody.

11. An exhaust centerbody in accordance with claim 10 wherein said plurality of scoops comprise pairs of entrance scoops and exit scoops.

12. An exhaust centerbody in accordance with claim 11 wherein said plurality of scoops extend radially outward from said exhaust centerbody.

13. An exhaust centerbody in accordance with claim 10 wherein said plurality of scoops extend radially inward from said exhaust centerbody.

14. A gas turbine engine comprising:
an exhaust centerbody having a longitudinal axis and comprising at least one stiffener, and an outer skin, said at least one stiffener attached to said outer skin and extending radially inward from said outer skin such that said at least one stiffener and said outer skin define an annular cavity therebetween, a downstream end of said centerbody sealed; and
a thermal control system disposed within said exhaust centerbody and configured to facilitate minimizing thermal stresses within said exhaust centerbody, said thermal control system comprising a plurality of openings extending through said centerbody outer skin to said cavity, at least a portion of said plurality of openings for receiving airflow therethrough from a gas turbine engine flowpath to facilitate inducing a circumferential airflow about the longitudinal axis to facilitate reducing thermal differences between said at least one stiffener and said centerbody, at least a portion of said plurality of openings also for discharging airflow therethrough such that airflow is discharged from said cavity only through said openings.

15. A gas turbine engine in accordance with claim 14 wherein said plurality of thermal control system openings disposed circumferentially around said exhaust centerbody and comprising pairs of exit openings and entrance openings, each of said exit openings disposed between said circumferentially adjacent entrance openings.

16. A gas turbine engine in accordance with claim 15 further comprising a plurality of struts upstream of said exhaust centerbody, said thermal control system entrance openings disposed downstream of each of said struts.

17. A gas turbine engine in accordance with claim 16 wherein each of said exit openings is disposed between two circumferentially adjacent struts.

18. A gas turbine engine in accordance with claim 15 further comprising a plurality of scoops attached to said exhaust centerbody.

19. A gas turbine engine in accordance with claim 18 wherein said plurality of scoops extend radially outward from said exhaust centerbody.

20. A gas turbine engine in accordance with claim 18 wherein said plurality of scoops extend radially inward from said exhaust centerbody.

* * * * *